US009298486B2

(12) United States Patent
Bragstad et al.

(10) Patent No.: US 9,298,486 B2
(45) Date of Patent: Mar. 29, 2016

(54) MANAGING VIRTUAL MACHINE IMAGES IN A DISTRIBUTED COMPUTING ENVIRONMENT

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 14/100,920

(22) Filed: Dec. 9, 2013

(65) Prior Publication Data
US 2015/0160957 A1    Jun. 11, 2015

(51) Int. Cl.
*G06F 9/455*    (2006.01)
*G06F 9/50*    (2006.01)

(52) U.S. Cl.
CPC .......... *G06F 9/45533* (2013.01); *G06F 9/5005* (2013.01); *G06F 9/5077* (2013.01)

(58) Field of Classification Search
CPC .................................................. G06F 9/45533
See application file for complete search history.

(56) References Cited

U.S. PATENT DOCUMENTS 8,886,865 B1 * 11/2014 Huang et al. ............... 711/6
2013/0185715 A1 * 7/2013 Dunning et al. ............ 718/1

OTHER PUBLICATIONS

Ammons, G., et al., "Virtual machine images as structured data: the Mirage image library", In Proceedings of the 3rd USENIX conference on Hot topics in cloud computing (2011), Jun. 15, 2011, pp. 1-6, IBM Research, USENIX Association Berkeley, CA, USA, URL: http://static.usenix.org/event/hotcloud11/tech/final_files/Ammons.pdf.
Virtual Machine Administration, "Using Snapshots to Manage Virtual Machines", VMware.com (online), [accessed Jun. 25, 2013], 2 pages, URL: http://pubs.vmware.com/vsphere-50/index.jsp?topic=%2Fcom.vmware.vsphere.vm_admin.doc_50%2FGUID-CA948C69-7F58-4519-AEB1-739545EA94E5.html.

* cited by examiner

*Primary Examiner* — Emerson Puente
*Assistant Examiner* — Steven Do
(74) *Attorney, Agent, or Firm* — Edward J. Lenart; Feb Cabrasawan; Kennedy Lenart Spraggins LLP

(57) ABSTRACT

Methods, apparatuses, and computer program products for managing virtual machine images in a distributed computing environment are provided. Embodiments includes a management system recording dependencies between the virtual machine images in the image service repository and dependencies between the deployed virtual machines in the compute service and the virtual machine images in the image service repository. Based on the recorded dependencies between the virtual machine images and the dependencies between the deployed virtual machines and the virtual machine images, the management system identifies a virtual machine image that has no deployed virtual machine dependent upon it. Embodiments also include the management system deleting, by the management system, the identified virtual machine image from the image service repository.

12 Claims, 9 Drawing Sheets

MANAGING VIRTUAL MACHINE IMAGES IN A DISTRIBUTED COMPUTING ENVIRONMENT

BACKGROUND OF THE INVENTION

1. Field of the Invention

The field of the invention is data processing, or, more specifically, methods, apparatuses, and computer program products for managing virtual machine images in a distributed computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include a plurality of machines that share resources with each other. In a distributed computing environment, there are thousands of resources that can be entrusted in a distributed computing environment and accessed as a service. These resources are of various types and often belong to various environments of different types and reside on the hardware of the environment.

SUMMARY

Methods, apparatuses, and computer program products for managing virtual machine images in a distributed computing environment are provided. Embodiments includes a management system recording dependencies between the virtual machine images in the image service repository and dependencies between the deployed virtual machines in the compute service and the virtual machine images in the image service repository. Based on the recorded dependencies between the virtual machine images and the dependencies between the deployed virtual machines and the virtual machine images, the management system identifies a virtual machine image that has no deployed virtual machine dependent upon it. Embodiments also include the management system deleting, by the management system, the identified virtual machine image from the image service repository.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
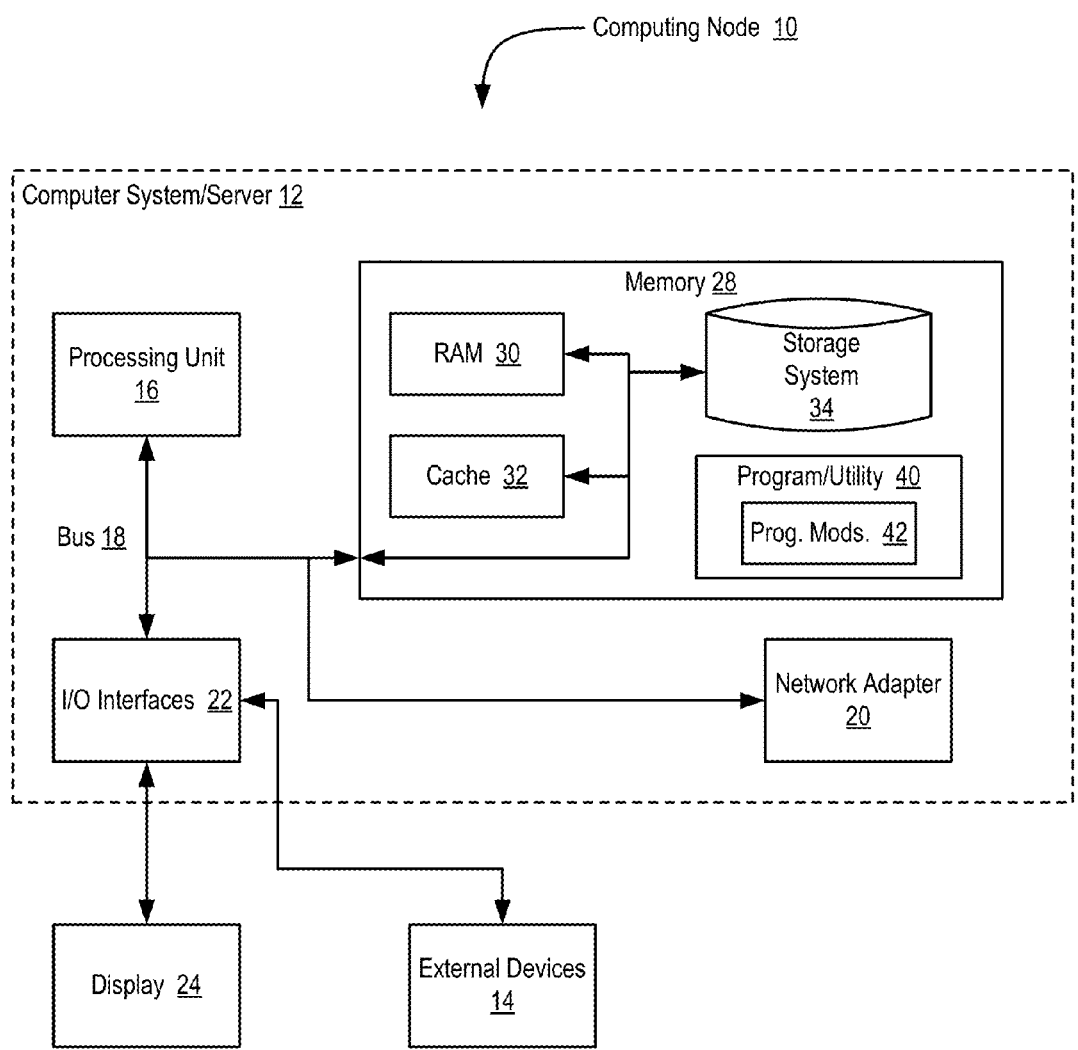
FIG. 1 depicts a cloud computing node according to an embodiment of the present invention.

Example methods, apparatuses, and computer program products for managing virtual machine images in a distributed computing environment in accordance with the present invention are described with reference to the accompanying drawings, beginning with FIG. 1. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service ('SaaS'): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service ('Paas'): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ('IaaS'): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnect ('PCI') bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM') (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output ('I/O') interfaces (22). Still yet, computer system/server (12) can communicate with one or more networks such as a local area network (IAN), a general wide area network ('WAN'), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
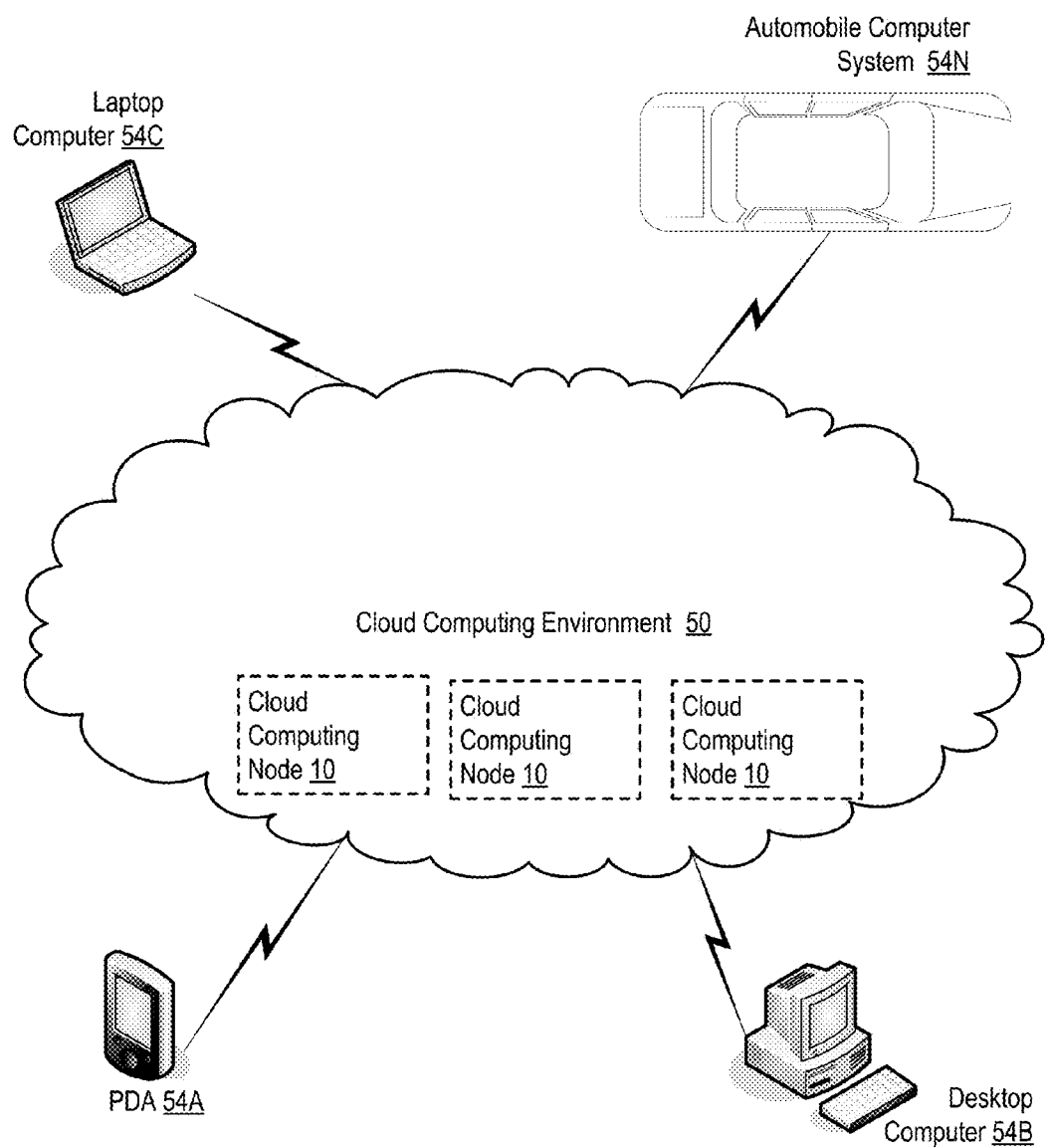
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant ('PDA') or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 2 are intended to be illustrative only and that computing nodes (10) and cloud computing environment (50) can communicate with any type of computerized device over any type of network and/or network addressable connection (e.g., using a web browser).

Figure 3:
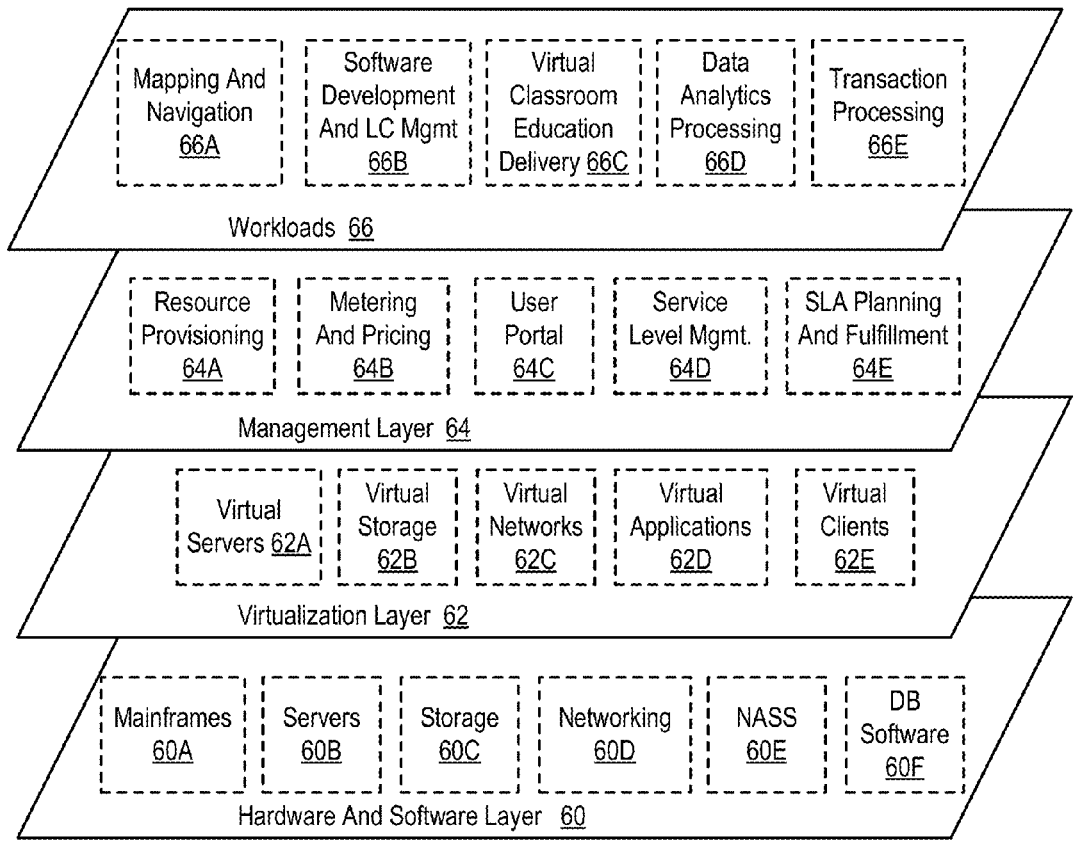
FIG. 3 depicts abstraction model layers according to an embodiment of the present invention.

Referring now to FIG. 3, a set of functional abstraction layers provided by cloud computing environment (element 50 in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer (60) includes hardware and software components. Examples of hardware components include mainframes (60A), in one example IBM® zSeries® systems; RISC (Reduced Instruction Set Computer) architecture based servers (60B), in one example IBM pSeries® systems; IBM xSeries® systems; IBM BladeCenter® systems; storage devices (60C); networks and networking components (60D). Examples of software components include network application server software (60E), in one example IBM WebSphere® application server software; and database software (60F), in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers (62A); virtual storage (62B); virtual networks (62C), including virtual private networks; virtual applications (62D) and operating systems; and virtual clients (62E).

In one example, management layer (64) may provide the functions described below. Resource provisioning (64A) provides dynamic procurement of computing resources and other resources that are utilized to perform tasks within the cloud computing environment. Metering and Pricing (64B) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (64C) provides access to the cloud computing environment for consumers and system administrators. Service level management (64D) provides cloud computing resource allocation and management such that required service levels are met. Service Level Agreement (SLA) planning and fulfillment (64E) provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation (66A); software development and lifecycle management (66B); virtual classroom education delivery (66C); data analytics processing (66D); and transaction processing (66E).

Figure 4:
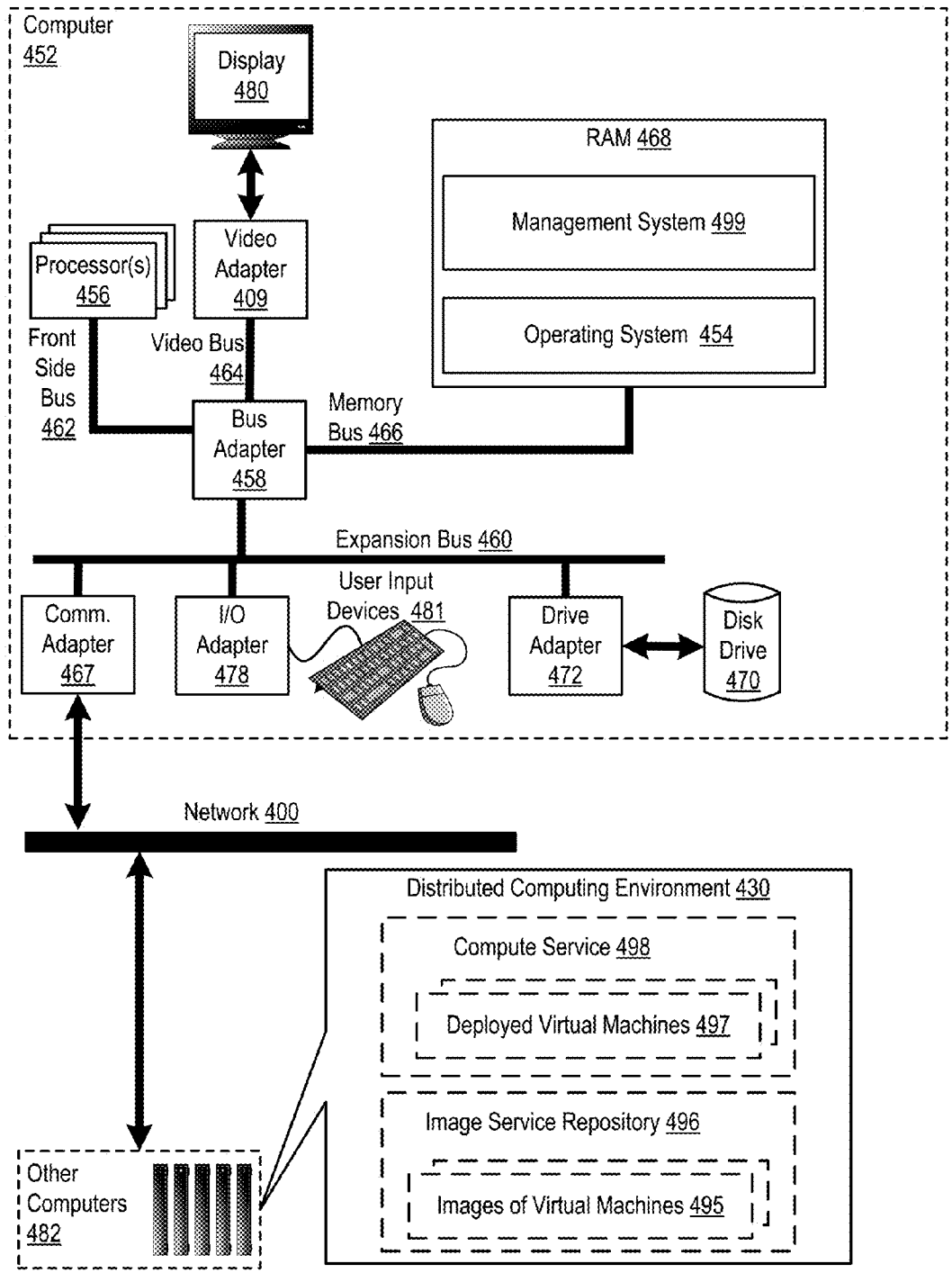
FIG. 4 sets forth a block diagram of automated computing machinery comprising an example computer useful in managing virtual machine images in a distributed computing environment according to embodiments of the present invention.

For further explanation, FIG. 4 sets forth a block diagram of automated computing machinery comprising an example computer useful in managing virtual machine images in a distributed computing environment according to embodiments of the present invention. The computer (452) of FIG. 4 includes at least one computer processor (456) or 'CPU' as well as random access memory (468) ('RAM') which is connected through a high speed memory bus (466) and bus adapter (458) to processor (456) and to other components of the computer (452).

Stored in RAM (468) is a management system (499), a module of computer program instructions that, when executed causes the computer (452) of FIG. 4 to provide an image to a virtual machine of a distributed computing environment. In the example of FIG. 4, a distributed computing environment (430) is created on components of other computers (482). The management system may also be configured to administer provisioning of virtual machines, cloud resources, memory, and the like; track customer or user usage of cloud resources; provide a systems management interface for configuration of virtual machine environments; and so on.

In the example of FIG. 4, the distributed computing environment includes a compute service (498) which includes deployed virtual machines (497) offered to users of the distributed computing environment (430) as a service. The distributed computing environment (430) also includes an image service repository (496) that stores images (495) of virtual machines.

In the example of FIG. 4, the management system (499) may managing virtual machine images in a distributed computing environment in accordance with embodiments of the present invention by recording dependencies between the virtual machine images (495) in the image service repository (496) and dependencies between the deployed virtual machines (497) in the compute service (498) and the virtual machine images (495) in the image service repository (496). Based on the recorded dependencies between the virtual machine images (495) and the dependencies between the deployed virtual machines (497) and the virtual machine images (495), the management system (499) identifies a virtual machine image that has no deployed virtual machine dependent upon it. The management system (499) is also configured to delete the identified virtual machine image from the image service repository.

Also stored RAM (468) of the computer (452) is an operating system (454). Operating systems useful for managing virtual machine images in a distributed computing environment according to embodiments of the present invention include UNIX™ Linux™ Microsoft XP™ AIX™ IBM's i5/OS™ and others as will occur to those of skill in the art. The operating systems (454) and the management system (499) in the example of FIG. 4 are shown in RAM (468), but many components of such software typically are stored in non-volatile memory also, such as, for example, on a disk drive (470).

The computer (452) of FIG. 4 includes disk drive adapter (472) coupled through expansion bus (460) and bus adapter (458) to the processors (456) and other components of the computer (452). Disk drive adapter (472) connects non-volatile data storage to the computer (452) in the form of the disk drive (470). Disk drive adapters useful in computers for managing virtual machine images in a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (452) of FIG. 4 includes one or more input/output ('I/O') adapters (478). I/O adapters implement user-oriented input/output through, for example, software drivers and computer hardware for controlling output to display devices such as computer display screens, as well as user input from user input devices (481) such as keyboards and mice. The example computer (452) of FIG. 4 includes a video adapter (409), which is an example of an I/O adapter specially designed for graphic output to a display device (480) such as a display screen or computer monitor. The video adapter (409) is connected to the processors (456) through a high speed video bus (464), bus adapter (458), and the front side bus (462), which is also a high speed bus.

The exemplary computer (452) of FIG. 4 includes a communications adapter (467) for data communications with the other computers (482) and for data communications with the data communications network (400). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing virtual machine images in a distributed computing environment according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 4 are for explanation, not for limitation. Data processing systems useful according to various embodiments of the present invention may include additional databases, servers, routers, other devices, and peer-to-peer architectures, not shown in FIG. 4, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4.

Figure 5:
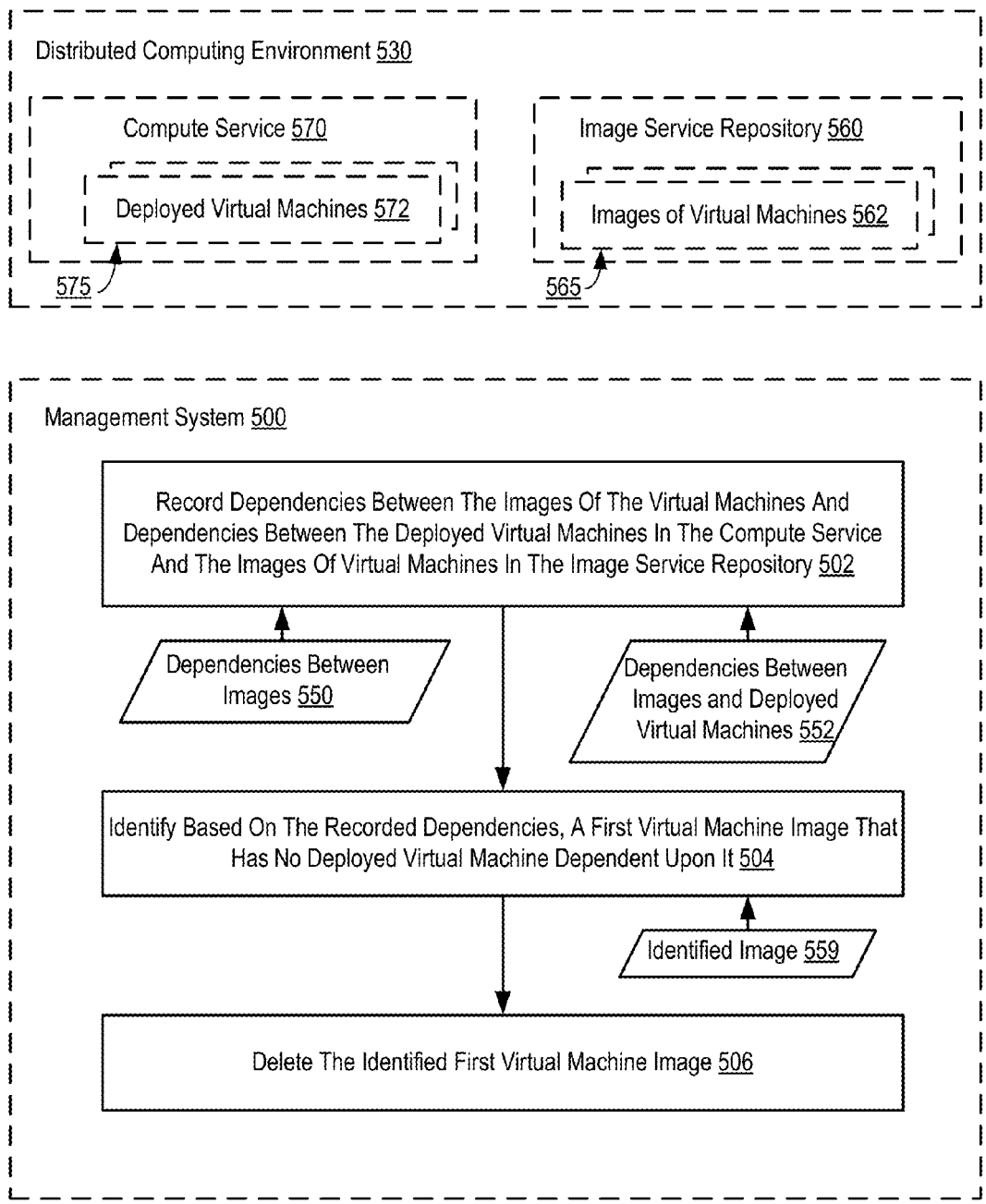
FIG. 5 sets forth a flow chart illustrating an example method for managing virtual machine images in a distributed computing environment according to embodiments of the present invention.

For further explanation, FIG. 5 sets forth a flow chart illustrating an exemplary method for managing virtual machine images in a distributed computing environment according to embodiments of the present invention. A distributed computing environment refers to a collection of computers, networks, and automated computing machinery configured to perform distributed processing. A non-limiting example of a distributed computing environment includes a cloud environment having a virtualized computing platform in which a user may be provided access to computing resources without knowledge, ownership, or physical access to the computer resources. The hardware, software, and capabilities of the components of a distributed computing environment or cloud environment may be offered to users as services or objects and may generally be referred to as resources. Non-limiting examples of resources include virtual machines, processing clusters, host operating systems, applications, processing threads, processing allocations, storage allocations, memory allocations, and any many others as will occur to readers of skill in the art.

In the example of FIG. 5, the distributed computing environment (530) comprises an image service repository (560) that includes virtual machine images (562). A virtual machine is a software implementation of a set of processes or a system. A virtual machine image is an image of a virtual machine. An image service repository is a storage area for storing the virtual machine images. The distributed computing environment (530) of FIG. 5 also comprises a compute service (570) that includes deployed virtual machines (572).

The method of FIG. 5 includes the management system (500) recording (502) dependencies (550) between the virtual machine images (562) in the image service repository (560) and dependencies (552) between the deployed virtual machines (572) in the compute service (570) and the virtual machine images (562) in the image service repository (560). Recording (502) dependencies (550) may be carried out by identifying information defining each virtual machine image and comparing it to information defining another virtual machine image; using the results of the comparison to identify which virtual machine images have shared information; using the identification of virtual machines having shared information and other information, such as timestamps, deployment data, and version number, to determine dependencies between the images; and recording those determined dependencies.

Recording (502) dependencies (552) may be carried out by identifying information defining each virtual machine image; identifying information defining each deployed virtual machine; comparing the information defining the virtual machine images and the information defining the deployed virtual machines to determine which virtual machine images have information in common with a deployed virtual machine; using the determination along with other information, such as timestamps, deployment data, and version number, to determine dependencies between the images and the deployed virtual machines; and recording those determined dependencies.

The method of FIG. 5 includes the management system (500) identifying (504) based on the recorded dependencies (550) between the virtual machine images and the dependencies (552) between the deployed virtual machines and the virtual machine images, a first virtual machine image (599) that has no deployed virtual machine dependent upon it. Identifying (504) a first virtual machine image (599) that has no deployed virtual machine dependent upon it may be carried out by examining the recorded dependencies (550) between the virtual machine images and the dependencies (552) between the deployed virtual machines and the virtual machine images to identify a virtual machine image that is not dependent upon a deployed virtual machine. For example, as will be explained in greater detail below, the management system (500) may examine a hierarchical representation of the recorded dependencies to identify any virtual machine images not dependent upon a deployed virtual machine. Identifying (504) a first virtual machine image (599) that has no deployed virtual machine dependent upon it may be carried out by identifying a virtual machine image that does not depend upon a deployed virtual machine and is not the latest or newest version of a particular virtual machine. That is, the management system may preserve the latest or newest copy of a virtual machine image.

The method of FIG. 5 also includes the management system (500) deleting the identified first virtual machine image (599) from the image service repository (560). Deleting the identified first virtual machine image (599) may be carried out by destroying the identified virtual machine image; or sending a message to the image repository service to destroy the identified virtual machine image.

Figure 6:
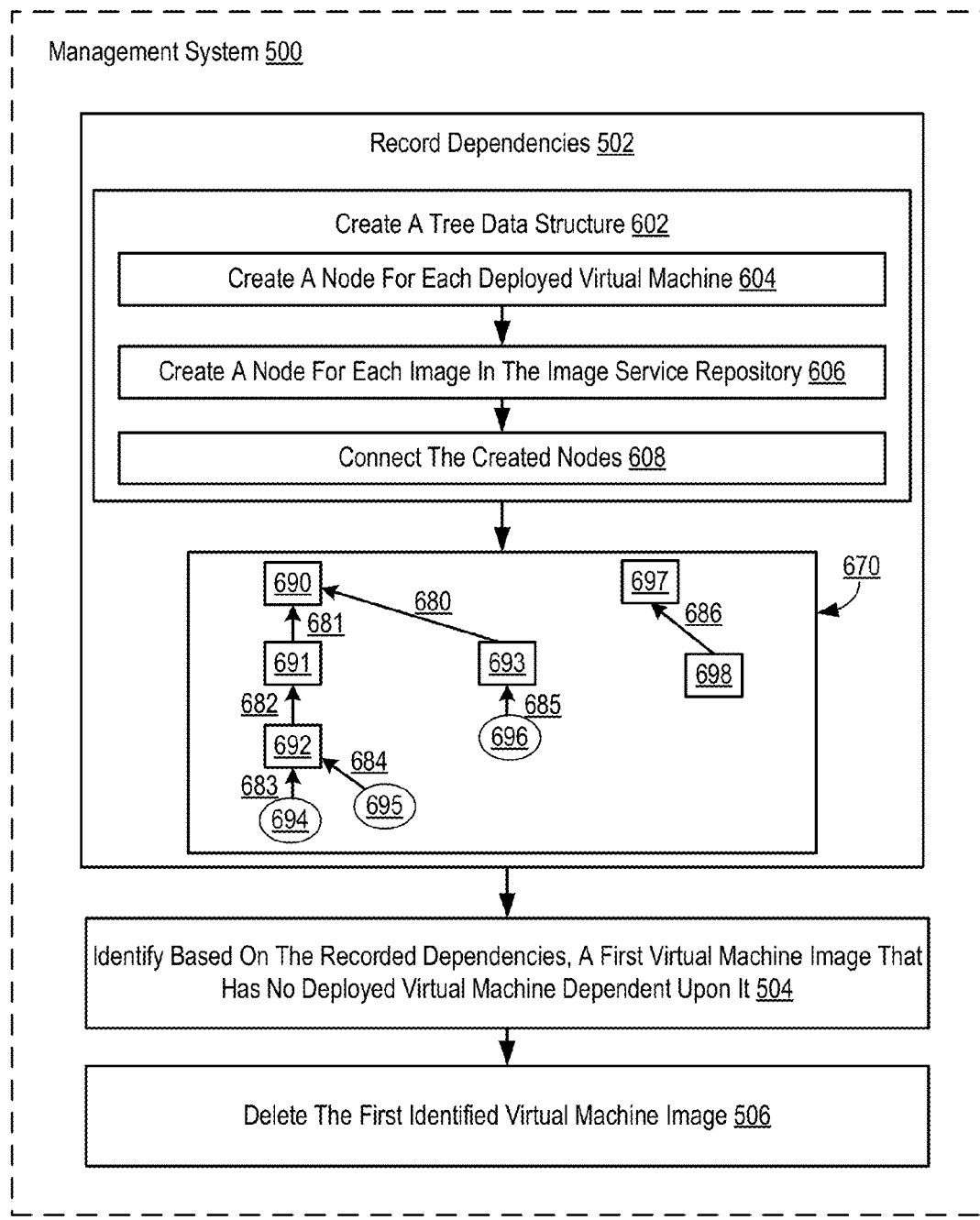
FIG. 6 sets forth a flow chart illustrating an additional example method for managing virtual machine images in a distributed computing environment according to embodiments of the present invention.

For further explanation, FIG. 6 sets forth a flow chart illustrating another example method for managing virtual machine images in a distributed computing environment according to embodiments of the present invention. The method of FIG. 6 is similar to the method of FIG. 5 in that the method of FIG. 6 also includes recording (502) dependencies (550) between the virtual machine images (562) in the image service repository (560) and dependencies (552) between the deployed virtual machines (572) in the compute service (570) and the virtual machine images (562) in the image service repository (560); identifying (504) based on the recorded dependencies (550) between the virtual machine images and the dependencies (552) between the deployed virtual machines and the virtual machine images, a virtual first machine image (599) that has no deployed virtual machine dependent upon it; and deleting the first identified virtual machine image (599).

In the method of FIG. 6, however, recording (502) dependencies (550) between the virtual machine images (562) in the image service repository (560) and dependencies (552) between the deployed virtual machines (572) in the compute service (570) and the virtual machine images (562) in the image service repository (560) includes creating (602) a tree data structure (670). A tree data structure is a data structure that indicates the dependencies between the virtual machine images and the dependencies between the virtual machine images and the deployed virtual machines.

In the example of FIG. 6, creating (602) a tree data structure (670) includes creating (604) a node (694, 695, 696) for each deployed virtual machine (572) in the compute service (570). Creating (604) a node (694, 695, 696) for each deployed virtual machine (572) in the compute service (570) may be carried out by storing within the tree data structure (670) a representation of a deployed virtual machine.

In the example of FIG. 6, creating (602) a tree data structure (670) includes creating (606) a node (690, 691, 692, 693, 697, 698) for each virtual machine image (562) in the image service repository (560). Creating (606) a node (690, 691, 692, 693, 697, 698) for each virtual machine image (562) in the image service repository (560) may be carried out by storing within the tree data structure (670) a representation of a deployed virtual machine.

In the example of FIG. 6, creating (602) a tree data structure (670) includes connecting (608) the created nodes (690-698) to indicate the dependencies (550) between the virtual machine images (562) in the image service repository (560) and the dependencies (552) between the deployed virtual machines (570) in the compute service (572) and the virtual machine images in the image service repository. Connecting (608) the created nodes (690-698) may be carried out by creating within the tree data structure (670), connections (680, 681, 682, 686) representing the dependencies (550) between the virtual machine images (562); and creating within the tree data structure (670), connections (683, 684, 685) representing the dependencies (552) between the virtual machine images (562) and the deployed virtual machines (572).

Figure 7:
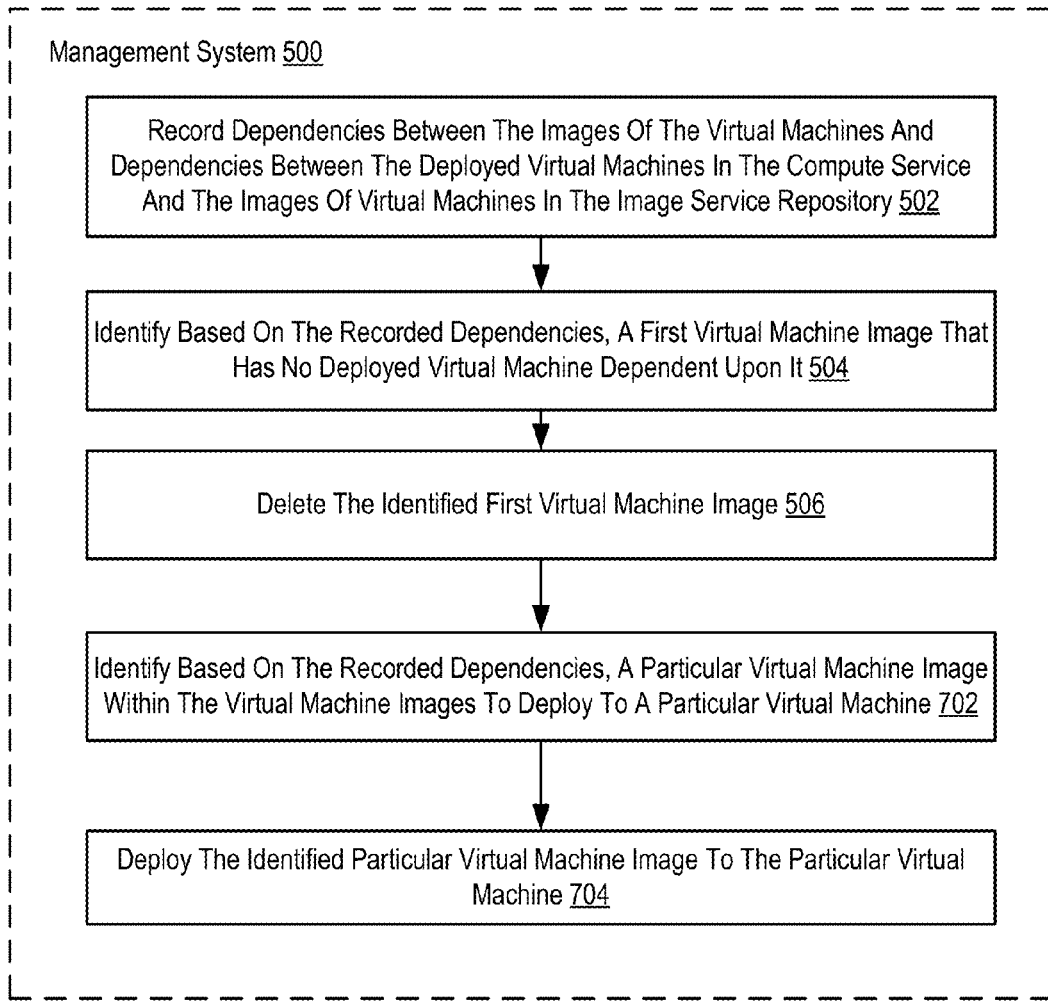
FIG. 7 sets forth a flow chart illustrating an additional example method for managing virtual machine images in a distributed computing environment according to embodiments of the present invention.

For further explanation, FIG. 7 sets forth a flow chart illustrating another example method for managing virtual machine images in a distributed computing environment according to embodiments of the present invention. The method of FIG. 7 is similar to the method of FIG. 5 in that the method of FIG. 7 also includes recording (502) dependencies (550) between the virtual machine images (562) in the image service repository (560) and dependencies (552) between the deployed virtual machines (572) in the compute service (570) and the virtual machine images (562) in the image service repository (560); identifying (504) based on the recorded dependencies (550) between the virtual machine images and the dependencies (552) between the deployed virtual machines and the virtual machine images, a first virtual machine image (599) that has no deployed virtual machine dependent upon it; and deleting the identified first virtual machine image (599).

The method of FIG. 7 includes the management system (500) identifying (702) based on the recorded dependencies (550) between the virtual machine images (562) and the recorded dependencies (552) between the virtual machine images (562) and the deployed virtual machines (572), a particular virtual machine image (565) within the virtual machines images (562) to deploy to a particular virtual machine (575). Identifying (702) a particular virtual machine image (565) within the virtual machines images (562) to deploy to a particular virtual machine (575) may be carried out by identifying from the dependencies (550, 552) the newest version or last used image for deployment on a virtual machine. That is, the management system (500) may use the dependencies (550, 552) to select a virtual machine image that best matches the needs of a virtual machine, including the need to have the most up-to-date image possible.

Identifying (702) a particular virtual machine image (565) within the virtual machines images (562) to deploy to a particular virtual machine (575) may be carried out by identifying from the dependencies (550, 552) and based on historical usage, a most used virtual machine image for deployment on a virtual machine. That is, the management system (500) may use the dependencies (550, 552) and historical usage to select a virtual machine image that best matches the needs of a virtual machine, including the need to have the most used image.

The method of FIG. 7 also includes the management system (500) deploying (704) the identified particular virtual machine image (565) to the particular virtual machine (575). Deploying (704) the identified particular virtual machine image (565) to the particular virtual machine (575) may be carried out by using the identified particular virtual machine image to implement the particular virtual machine.

Figure 8:
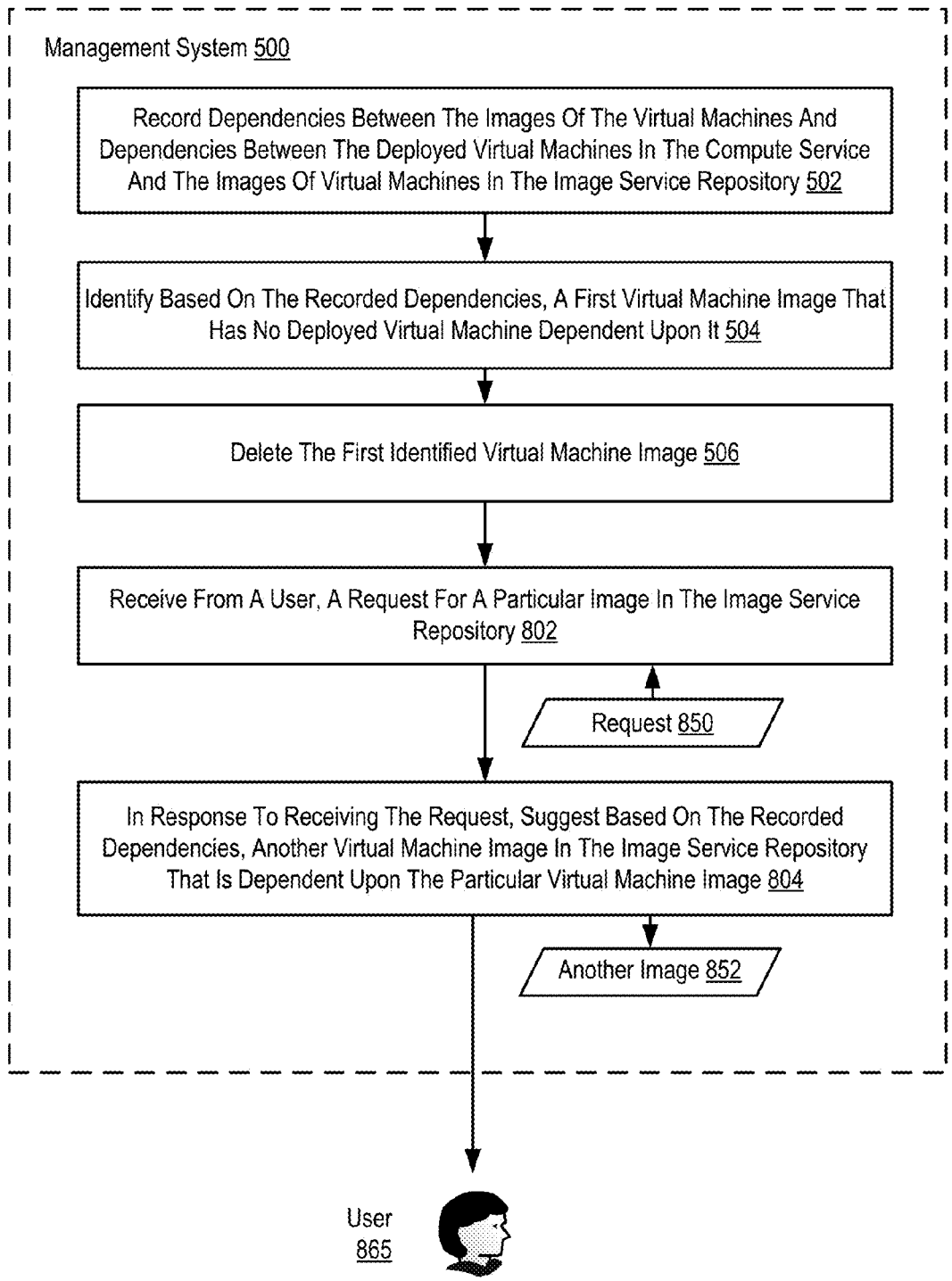
FIG. 8 sets forth a flow chart illustrating an additional example method for managing virtual machine images in a distributed computing environment according to embodiments of the present invention.

For further explanation, FIG. 8 sets forth a flow chart illustrating another example method for managing virtual machine images in a distributed computing environment according to embodiments of the present invention. The method of FIG. 8 is similar to the method of FIG. 5 in that the method of FIG. 8 also includes recording (502) dependencies (550) between the virtual machine images (562) in the image service repository (560) and dependencies (552) between the deployed virtual machines (572) in the compute service (570) and the virtual machine images (562) in the image service repository (560); identifying (504) based on the recorded dependencies (550) between the virtual machine images and the dependencies (552) between the deployed virtual machines and the virtual machine images, a first virtual machine image (599) that has no deployed virtual machine dependent upon it; and deleting the identified first virtual machine image (599).

The method of FIG. 8 includes the management system (500) receiving (802) from a user (865), a request (850) for a particular virtual machine image in the image service repository (560). Receiving (802) from a user (865), a request (850) for a particular virtual machine image in the image service repository (560) may be carried out by receiving user input requesting a specific virtual machine image.

The method of FIG. 8 also includes the management system (500) suggesting (804) based on the recorded dependencies (550) between the virtual machine images (562) and the dependencies (552) between the deployed virtual machines (572) and the virtual machine images (562), another virtual machine image (852) in the image service repository (560) that is dependent upon the particular virtual machine image in response to receiving the request (850). Suggesting (804) another virtual machine image (852) in the image service repository (560) that is dependent upon the particular virtual machine image may be carried out by examining the recorded dependencies (550) between the virtual machine images (562) and the dependencies (552) between the deployed virtual machines (572) and the virtual machine images (562) to identify any newer or more robust versions of the virtual machine image. For example, the management system (500) may examine the tree data structure (670) of FIG. 6 to identify any child virtual machine images of the second virtual machine image. Suggesting (804) another virtual machine image (852) in the image service repository (560) that is dependent upon the particular virtual machine image may also be carried out by presenting to a user via a graphical user interface, the option of selecting the suggested other virtual machine image (852).

Figure 9:
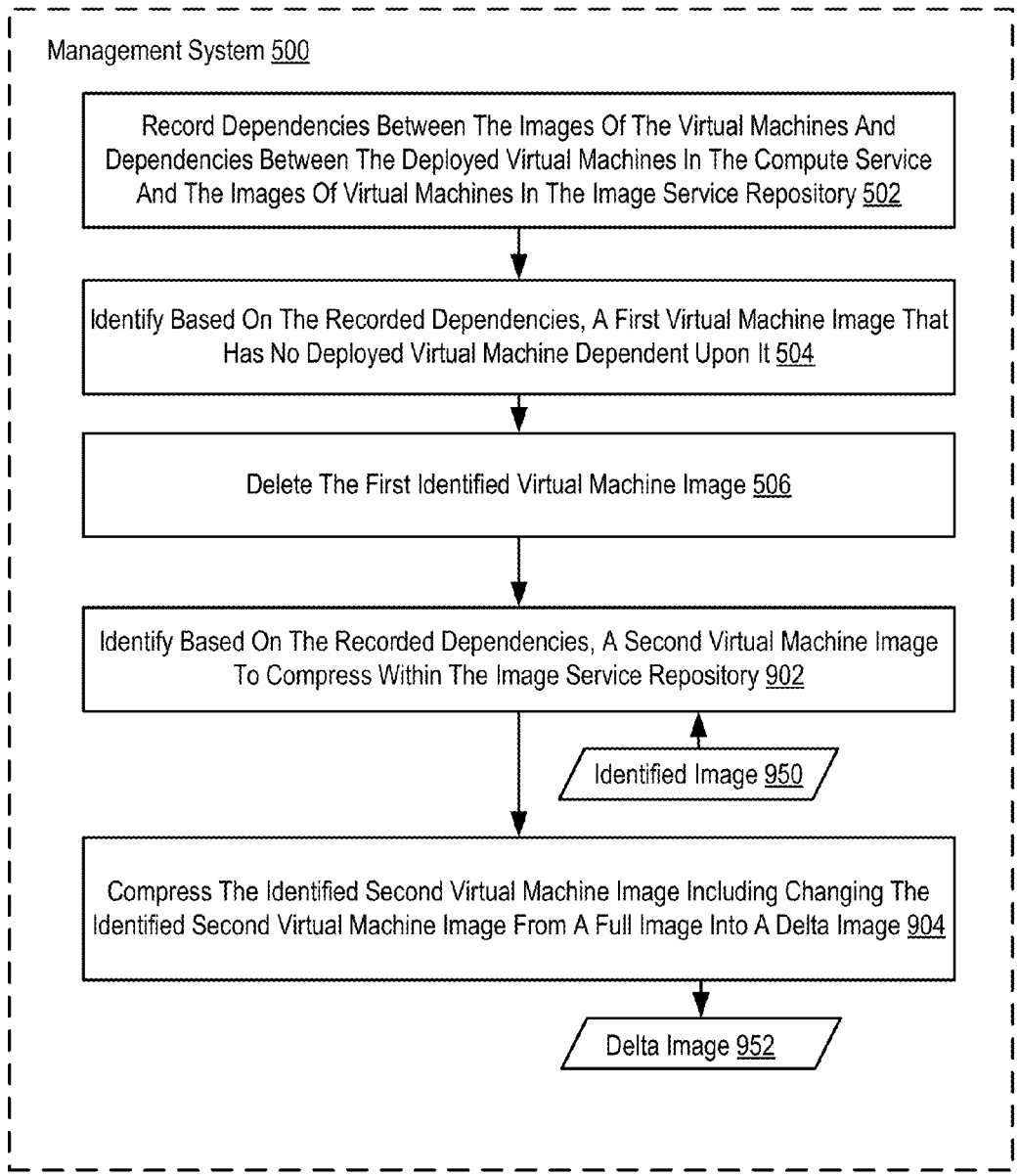
FIG. 9 sets forth a flow chart illustrating an additional example method for managing virtual machine images in a distributed computing environment according to embodiments of the present invention.

For further explanation, FIG. 9 sets forth a flow chart illustrating another example method for managing virtual machine images in a distributed computing environment according to embodiments of the present invention. The method of FIG. 9 is similar to the method of FIG. 5 in that the method of FIG. 9 also includes recording (502) dependencies (550) between the virtual machine images (562) in the image service repository (560) and dependencies (552) between the deployed virtual machines (572) in the compute service (570) and the virtual machine images (562) in the image service repository (560); identifying (504) based on the recorded dependencies (550) between the virtual machine images and the dependencies (552) between the deployed virtual machines and the virtual machine images, a first virtual machine image (599) that has no deployed virtual machine dependent upon it; and deleting the identified first virtual machine image (599).

The method of FIG. 9 includes the management system (500) identifying (902) based on the recorded dependencies (550) between the virtual machine images (562) and the dependencies (552) between the deployed virtual machines (572) and the virtual machine images (562), a second virtual machine image (950) to compress within the image service repository (560). Identifying (902) a second virtual machine image (950) to compress within the image service repository (560) may be carried out by identifying an unused virtual machine image that is stored as a full image; and identifying a virtual machine image that is stored as a full image and is identified as not being an image that the management system would recommend to a user (e.g., is not the best or most current image to use).

Identifying (902) a second virtual machine image (950) to compress within the image service repository (560) may also be carried out by identifying an unused virtual machine image that is stored as a full image and is not identified as a candidate for deletion. The management system may identify virtual machines images as candidates for deletion based on historical usage, priority information, and any other attribute or factor that would occur to readers of skill in the art. A candidate for deletion may be a virtual machine image that is one of a predetermined number of virtual machine images that are next to be deleted.

The method of FIG. 9 also includes the management system (500) compressing (904) the identified second virtual machine image (950) including changing the identified second virtual machine image from a full image to a delta image (952). Delta encoding is a way of storing or transmitting data in the form of differences between sequential data rather than complete files; more generally this is known as data differencing. Delta encoding is sometimes called delta compression, particularly where archival histories of changes are required (e.g., in revision control software). The differences are recorded in discrete files called "deltas" or "diffs", after the UNIX file comparison utility, diff. In situations where differences are small—for example, the change of a few words in a large document or the change of a few records in a large table—delta encoding greatly reduces data redundancy. Collections of unique deltas are substantially more space-efficient than their non-encoded equivalents. From a logical point of view the difference between two data values is the information required to obtain one value from the other. The difference between identical values (under some equivalence) is often called 0 or the neutral element. Compressing (904) the identified first virtual machine image (950) including changing the identified first virtual machine image from a full image to a delta image (952) may be carried out by identifying the differences between the image (950) and another image and only storing the identified differences.

In a particular embodiment, the management system (500) may also be configured to uncompress a virtual machine image or create a new delta image to allow for deletion of a virtual machine image. For example, the management system (500) may determine that a first delta image is no longer needed and may apply the first delta image changes to a full image that corresponds to the first delta image. In this example, the management system (500) may then delete the first delta image. As another example, as part of compressing and pruning the virtual machine images in the image service repository, the management system (500) may combine multiple delta images together to form a new delta image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for managing virtual machine images in a distributed computing environment, the distributed computing environment comprising an image service repository that includes virtual machine images, the distributed computing environment further comprising a compute service that includes deployed virtual machines, the apparatus including a computer processor and a computer memory operatively coupled to the computer processor, the computer memory having disposed within it computer program instructions that, when executed by the computer processor, cause the apparatus to carry out the steps of:

recording dependencies between the virtual machine images in the image service repository and dependencies between the deployed virtual machines in the compute service and the virtual machine images in the image service repository;

identifying based on the recorded dependencies between the virtual machine images and the dependencies between the deployed virtual machines and the virtual machine images, by the management system, a first virtual machine image that has no deployed virtual machine dependent upon it;

deleting, by the management system, the identified first virtual machine image from the image service repository;

receiving from a user, by the management system, a request for a particular virtual machine image in the image service repository; and in response to receiving the request, suggesting based on the recorded dependencies between the virtual machine images and the dependencies between the deployed virtual machines and the virtual machine images, by the management system, another virtual machine image in the image service repository that is dependent upon the particular virtual machine image.

2. The apparatus of claim 1 wherein recording dependencies between the virtual machine images in the image service repository and dependencies between the deployed virtual machines in the compute service and the virtual machine images in the image service repository further comprises creating a tree data structure including:

creating a node for each deployed virtual machine in the compute service;

creating a node for each virtual machine image in the image service repository; and connecting the created nodes to indicate the dependencies between the virtual machine images in the image service repository and the dependencies between the deployed virtual machines in the compute service and the virtual machine images in the image service repository.

3. The apparatus of claim 1 further comprising computer memory having disposed within it computer program instructions that, when executed by the computer processor, cause the apparatus to carry out the steps of:

identifying based on the recorded dependencies between the virtual machine images and the dependencies between the deployed virtual machines and the virtual machine images, by the management system, a particular virtual machine image within the virtual machines images to deploy to a particular virtual machine; and deploying, by the management system, the identified particular virtual machine image to the particular virtual machine.

4. The apparatus of claim 1 further comprising computer memory having disposed within it computer program instructions that, when executed by the computer processor, cause the apparatus to carry out the steps of:

identifying based on the recorded dependencies between the virtual machine images and the dependencies between the deployed virtual machines and the virtual machine images, by the management system, a second virtual machine image to compress within the image service repository; and compressing, by the management system, the identified second virtual machine image including changing the identified second virtual machine image from a full image to a delta image.

5. The apparatus of claim 4 wherein the delta image indicates the difference between the second virtual machine image and another virtual machine image it is dependent upon.

6. A computer program product for managing virtual machine images in a distributed computing environment, the distributed computing environment comprising an image service repository that includes virtual machine images, the distributed computing environment further comprising a compute service that includes deployed virtual machines, the computer program product disposed upon a computer readable medium, wherein the computer readable medium is not a signal, the computer program product comprising computer program instructions that, when executed, cause a computer to carry out the steps of:

recording dependencies between the virtual machine images in the image service repository and dependencies between the deployed virtual machines in the compute service and the virtual machine images in the image service repository;

identifying based on the recorded dependencies between the virtual machine images and the dependencies between the deployed virtual machines and the virtual machine images, by the management system, a first virtual machine image that has no deployed virtual machine dependent upon it;

deleting, by the management system, the identified first virtual machine image from the image service repository;

receiving from a user, by the management system, a request for a particular virtual machine image in the image service repository; and in response to receiving the request, suggesting based on the recorded dependencies between the virtual machine images and the dependencies between the deployed virtual machines and the virtual machine images, by the management system, another virtual machine image in the image service repository that is dependent upon the particular virtual machine image.

7. The computer program product of claim 6 wherein recording dependencies between the virtual machine images in the image service repository and dependencies between the deployed virtual machines in the compute service and the virtual machine images in the image service repository further comprises creating a tree data structure including:

creating a node for each deployed virtual machine in the compute service;

creating a node for each virtual machine image in the image service repository; and connecting the created nodes to indicate the dependencies between the virtual machine images in the image service repository and the dependencies between the deployed virtual machines in the compute service and the virtual machine images in the image service repository.

8. The computer program product of claim 6 further comprising computer program instructions that, when executed, cause a computer to carry out the steps of:
identifying based on the recorded dependencies between the virtual machine images and the dependencies between the deployed virtual machines and the virtual machine images, by the management system, a particular virtual machine image within the virtual machines images to deploy to a particular virtual machine; and
deploying, by the management system, the identified particular virtual machine image to the particular virtual machine.

9. The computer program product of claim 6 further comprising computer program instructions that, when executed, cause a computer to carry out the steps of:
receiving from a user, by the management system, a request for a particular virtual machine image in the image service repository; and
in response to receiving the request, suggesting based on the recorded dependencies between the virtual machine images and the dependencies between the deployed virtual machines and the virtual machine images, by the management system, another virtual machine image in the image service repository that is dependent upon the particular virtual machine image.

10. The computer program product of claim 6 further comprising computer program instructions that, when executed, cause a computer to carry out the steps of:
identifying based on the recorded dependencies between the virtual machine images and the dependencies between the deployed virtual machines and the virtual machine images, by the management system, a second virtual machine image to compress within the image service repository; and
compressing, by the management system, the identified second virtual machine image including changing the identified second virtual machine image from a full image to a delta image.

11. The computer program product of claim 10 wherein the delta image indicates the difference between the second virtual machine image and another virtual machine image it is dependent upon.

12. The computer program product of claim 6 wherein the computer readable medium comprises a storage medium.

* * * * *